United States Patent Office 3,231,451
Patented Jan. 25, 1966

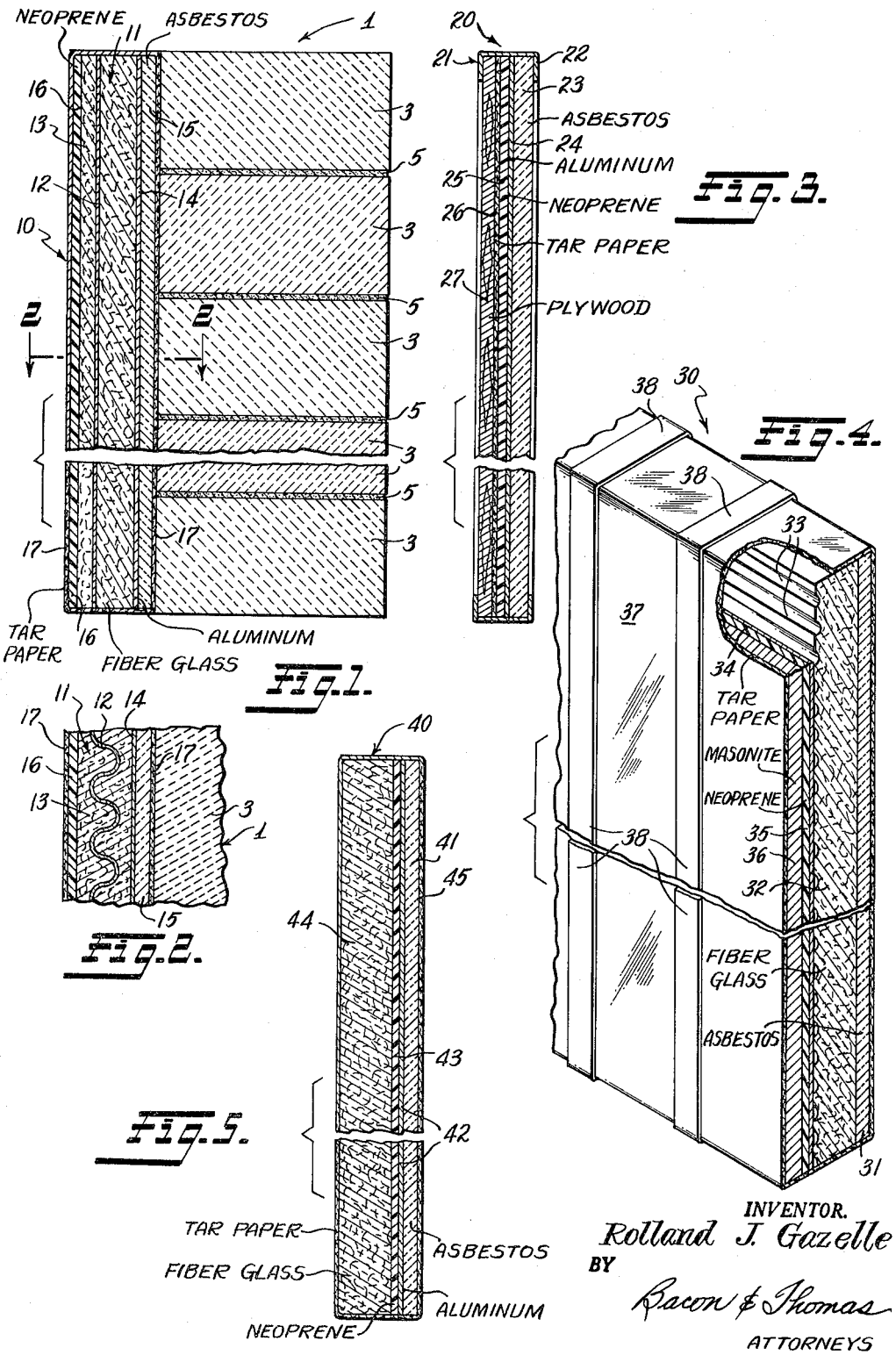

3,231,451
RADIATION BARRIER PANELS
Rolland J. Gazelle, Washington, D.C., assignor of one-half to Robert S. Yale, Chevy Chase, Md.
Filed Nov. 1, 1961, Ser. No. 149,426
1 Claim. (Cl. 161—43)

This invention relates generally to panels, and more particularly to a novel form of panel construction adapted to be mounted inside existing structures to serve as a barrier against fallout radiation and to protect against fire, heat, and other hazards which would be anticipated in the event of a nuclear explosion.

As the possibilities of nuclear warfare have become more evident, the necessity of fallout protection has become a matter of urgent concern on the part of peoples everywhere, and the construction of fallout shelters has been adopted as a high-priority program by many governments. Numerous expedients have been proposed for modifying existing structures to provide family or community shelters, and many materials and designs have been suggested for building new structures. However, most of the shelters which have been considered have failed to provide the requisite protection at a realistic cost.

A primary object of the present invention is to provide an efficient radiation barrier which can be installed as a lining in existing structures or as a part of new construction.

A further object is to provide a radiation barrier which guards against such attendant hazards as heat and fire, and one which is rigid and strong in construction.

Another object is to provide a radiation barrier which is economical to produce and to install and one which is durable in use.

Still another object is to provide a radiation barrier which may be mass-produced in the form of panels which can be readily assembled for installation at the building site to produce either family-type or community-type shelters.

Other objects and advantages will be apparent from the following description, when read in conjunction with the accompanying drawings, in which:

FIG. 1 is a sectional view illustrating a brick wall lined with a panel constructed in accordance with the principles of the present invention;

FIG. 2 is a fragmentary horizontal section taken on the line 2—2 of FIG. 1;

FIG. 3 is a fragmentary vertical sectional view illustrating another embodiment of the present invention;

FIG. 4 is a fragmentary perspective view illustrating a third embodiment of the present invention, certain portions of the structure being cut away to disclose details of the lamination employed; and FIG. 5 is a fragmentary vertical sectional view of still another form of the invention.

Referring now more specifically to the drawings, a brick wall is generally indicated by the numeral 1 in FIG. 1 and comprises bricks 3 secured together in the conventional manner by means of mortar 5 or the like. The wall 1 may comprise a portion of an existing structure, such as a basement wall or the like. A panel 10 is mounted on the inner face of the wall and comprises a central core 11, including a sheet 12 of vertically corrugated aluminum plate or the like. The aluminum plate should be at least one-sixteenth of an inch in thickness and is corrugated to a gross thickness of one inch. The aluminum plate 12 is embedded in loose or woven fiber glass 13 mounted on either side thereof effecting an overall core with a thickness of approximately three inches. If desired, the fiber glass can be set in a suitable resin to provide a rigid core.

A flat plate of aluminum 14 is mounted outwardly of the core and has a thickness of one-sixteenth of an inch or more. A sheet of asbestos board 15 is in turn mounted on the outer surface of the plate 14. The asbestos board is at least one-quarter inch in thickness and is adapted to function with the fiber glass 13 as a heat barrier, as well as serving to reduce the hazards of fire. The insulative characteristics of the panel also tend to keep out the cold when the panels are in every day use.

A sheet 16 of neoprene or the like, approximately one-sixteenth of an inch in thickness is mounted on the rear face of the core and functions with the aluminum plates 12 and 14 to reduce the hazards of radiation. The aluminum plates, of course, serve the additional purpose of providing structural strength and rigidity.

In the foregoing embodiment the entire panel is surrounded by tar paper 17 or the like which serves to protect the components of the panel from moisture and humidity, and which may also be employed to hold the various elements in assembled relation. The tar paper 17 is also useful from the standpoint of heat insulation. Suitable adhesive bonding (not shown) may also be employed between the laminations to hold them together.

In the embodiment of FIG. 3, the panel 20 is assembled in a frame 21 comprising a plurality of aluminum channel members 22 or the like. In this form the outer layer of the panel comprises an asbestos board 23, one-quarter of an inch or more in thickness, having a sheet of aluminum plate 24 approximately one-sixteenth of an inch in thickness disposed on its inner face. A one-quarter inch neoprene sheet 25 or the like is mounted inwardly of plate 24 and is backed by tar paper 26 or the like. An interior facing 27 of plywood, Sheetrock, Masonite or the like is provided at the inner face of the panel.

The panel 30 illustrated in FIG. 4 comprises an outer layer of asbestos board 31 which is one-fourth of an inch or more in thickness and is backed by an interior core 32 of molded fiber glass which may be embossed or otherwise shaped, as illustrated, to provide a plurality of insulative air spaces 33. In this instance the fiber glass is backed by the aluminum plate 34 and the neoprene sheet 35, both being of the dimensions described in connection with the embodiments of FIGS. 1 and 3. A Masonite sheet 36 is disposed at the rear of the panel and tar paper 37 surrounds the entire assembly. A plurality of steel straps 38 or the like may be disposed around the outside of the panel to assist in holding it in assembled relation.

In the embodiment of FIG. 5 the panel 40 comprises an outer sheet of asbestos 41 approximately one-quarter inch in thickness, backed by an aluminum plate 42 at least one-sixteenth inch in thickness, which is in turn lined with a neoprene sheet 43 between one-sixteenth and one-eighth of an inch in thickness. Loose fiber glass is disposed behind the neoprene sheet 43, to the extent of one to two inches in thickness. The entire panel is enveloped in a layer of tar paper 45.

It will be recognized that the foregoing embodiments are presented by way of illustration only. Numerous changes in the construction, dimensions and material will occur to those skilled in the art, and such modifications may be made without departing from the spirit of the invention or the scope of the annexed claim.

I claim:

A protective panel adapted to be used for modifying existing structures to limit the effects of nuclear explosions, comprising an aluminum sheet at least one-sixteenth inch in thickness having an inner and an outer face, a sheet of asbestos at least one-fourth inch in thickness mounted on the exterior face of said aluminum sheet, a core including a layer of fiber glass of approximately three inches in thickness disposed on the inner face of said aluminum sheet and provided with a rigid reinforcing sheet of longitudinally corrugated aluminum embedded therein for structural stability, a sheet of neoprene approximately one-sixteenth inch in thickness disposed outwardly of said core, and means for holding said sheets in juxtaposed assembled relation against the respective sides of said core, said means including an enveloping sheet of tar paper.

References Cited by the Examiner

UNITED STATES PATENTS

| | | | |
|---|---|---|---|
| 1,115,714 | 11/1914 | Miller | 154—45.9 |
| 2,003,934 | 6/1935 | Hansel | 156—333 X |
| 2,244,352 | 6/1941 | Young et al. | 154—43 |
| 2,312,987 | 3/1943 | Grassick | 154—44 |
| 2,732,886 | 1/1956 | Andreoli et al. | 154—51 |
| 2,773,459 | 12/1956 | Seehy | 250—108 |
| 2,928,948 | 3/1960 | Silversher | 250—108 |
| 2,983,821 | 5/1961 | Cap | 250—108 |
| 3,007,596 | 11/1961 | Matsch | 154—44 |
| 3,061,491 | 10/1962 | Sherrard et al. | 250—108 |
| 3,065,351 | 11/1962 | Weinberger et al. | 250—108 |

ALEXANDER WYMAN, *Primary Examiner.*

EARL M. BERGERT, *Examiner.*